United States Patent
Samatov et al.

(10) Patent No.: US 10,289,390 B2
(45) Date of Patent: May 14, 2019

(54) INTERACTIVE MULTIMODAL DISPLAY PLATFORM

(71) Applicant: White Knight Investments, Inc., Century City, CA (US)

(72) Inventors: Jack Samatov, Los Angeles, CA (US); Lotch Samatov, Los Angeles, CA (US)

(73) Assignee: SHADOWBOX INC., Carlsbad, CA (US)

( * ) Notice: Subject to any disclaimer, the term of this patent is extended or adjusted under 35 U.S.C. 154(b) by 207 days.

(21) Appl. No.: 15/329,564

(22) PCT Filed: Jan. 5, 2015

(86) PCT No.: PCT/US2015/010203
§ 371 (c)(1),
(2) Date: Jan. 26, 2017

(87) PCT Pub. No.: WO2015/103568
PCT Pub. Date: Jul. 9, 2015

(65) Prior Publication Data
US 2017/0315790 A1 Nov. 2, 2017

Related U.S. Application Data

(60) Provisional application No. 61/923,321, filed on Jan. 3, 2014.

(51) Int. Cl.
*G06F 8/38* (2018.01)
*G06F 8/60* (2018.01)
(Continued)

(52) U.S. Cl.
CPC .......... *G06F 8/38* (2013.01); *G06F 8/60* (2013.01); *G06F 8/61* (2013.01); *G06F 9/451* (2018.02)

(58) Field of Classification Search
CPC ... G06F 8/38; G06F 9/451; G06F 8/60; G06F 8/61
(Continued)

(56) References Cited

U.S. PATENT DOCUMENTS 7,150,002 B1 * 12/2006 Anderson ........... G06F 11/3664
717/107
7,669,141 B1 * 2/2010 Pegg ....................... G06F 9/451
715/781
(Continued)

FOREIGN PATENT DOCUMENTS

WO PCT/US2015/010203 4/2015

*Primary Examiner* — Duy Khuong T Nguyen
*Assistant Examiner* — Theodore E Hebert
(74) *Attorney, Agent, or Firm* — Vitality IP; Saleh Kaihani

(57) ABSTRACT

An interactive multimodal display platform comprising a rich Internet application (RIA) built on a cross-platform runtime system that allows a user to combine, connect and customize Web-based applications and local, user-created content for display in a multi-view Presentation. Users can open for a quick view any number of files in different formats from their desktops. The multi-view Presentation may include one or more Acts, with each Act containing up to sixteen Pods in the form of a rotatable three-dimensional cube, with each Pod displaying any file type as selected by the user. All Pods may be interactive with all other Pods within a single Act, and any change to a Pod can trigger corresponding changes in other Pods. After the user has created a customized Act, the Act may be saved as a Rich Interactive Content (RIC) desktop file or saved to the cloud and shared with other users.

14 Claims, 6 Drawing Sheets

(51) Int. Cl.
*G06F 8/61* (2018.01)
*G06F 9/451* (2018.01)

(58) Field of Classification Search
USPC .......................................................... 717/107
See application file for complete search history.

(56) References Cited

U.S. PATENT DOCUMENTS

| | | | |
|---|---|---|---|
| 7,827,494 B1* | 11/2010 | Hedayatpour | G06F 8/38 |
| | | | 709/203 |
| 9,858,166 B1* | 1/2018 | Gong | G06F 17/30595 |
| 2009/0228716 A1* | 9/2009 | Poston | G06F 21/6209 |
| | | | 713/189 |
| 2010/0161660 A1* | 6/2010 | De Angelo | G06F 17/30011 |
| | | | 707/770 |
| 2010/0251128 A1* | 9/2010 | Cordasco | G06F 11/328 |
| | | | 715/736 |
| 2011/0029963 A1* | 2/2011 | Smith | G06F 8/61 |
| | | | 717/171 |
| 2011/0289140 A1* | 11/2011 | Pletter | G06F 17/30575 |
| | | | 709/203 |
| 2012/0102402 A1* | 4/2012 | Kwong | G06F 3/038 |
| | | | 715/705 |
| 2012/0216122 A1* | 8/2012 | Wong | G06F 17/30867 |
| | | | 715/738 |
| 2013/0215116 A1* | 8/2013 | Siddique | G06Q 30/0643 |
| | | | 345/420 |
| 2014/0019892 A1* | 1/2014 | Mayerhofer | G06F 3/0482 |
| | | | 715/763 |
| 2017/0315790 A1* | 11/2017 | Samatov | G06F 8/61 |

* cited by examiner

INTERACTIVE MULTIMODAL DISPLAY PLATFORM

CROSS-REFERENCE TO RELATED APPLICATIONS

This application is a national stage entry of PCT Application No. PCT/US2015/010203, filed Jan. 5, 2015, which claims the benefit of and priority to U.S. Provisional Application No. 61/923,321, entitled "Interactive Display Platform," filed Jan. 3, 2014, to inventors Jack Samatov and Lotch Samatov, the disclosures of which are incorporated by reference herein in their entireties.

BACKGROUND OF THE INVENTION

1. Field of the Invention

The invention relates generally to software applications, and in particular, an interactive display system and a method of connecting disconnected sources, accessing, processing, displaying and arranging content presented in multiple content blocks simultaneously on a computer interface.

2. Description of the Related Art

In today's technology, structured and unstructured data comes at a user from many different sources in different formats. Viewing so much data and creating connections or interactive narratives is challenging due to the various divergent sources, unsupportive operating systems, software-specific hardware, different software, and many platforms, devices, channels, formats, codecs, streaming data types, and proprietary data architectures, just to name a few. Multimodal interaction is the process of integrating data from multiple sources into a consistent, accurate, and useful representation for the viewer, and a multimodal interface provides the tools for the input and output of multimodal data. The functional role of a multimodal display platform or interface is to assist the end user in viewing, organizing, presenting and interacting with diverse multimedia content. At the lowest level, the display platform organizes disparate data types and connects relevant incoming data from different sources. At the highest level, the display platform may provide actionable intelligence to users' daily activity and search experience while enhancing and personalizing user performance in passively monitoring and actively interacting with multiple platforms simultaneously.

Passive computer presentations might accurately present the fused data, but if the mental model of the human operator is not consistent with the display, the system usability might not improve performance. One way to improve operator performance is to design an interactive interface that provides the capability to interact and refine the display. As an example, the data collection may be refined so as to get more image perspectives for a 3D target presentation or multiple looks on the same target. When the end user interacts with the system, he or she is transformed from a passive operator to an active user.

Multimodal interface design (MID) is a concept that leverages the ability to filter incoming data. As an example, ME) is a key feature in military and intelligence applications, security systems, aviation simulators, weather analysis platforms, and video games. MIDs augment display information with control inputs, audio warnings, and some proprioceptive information. Such examples are audio warnings for threat assessment and control interactions affording the analyst the ability to cue in on data or narrow down to specific areas of interest. Additionally, classifying image fusion selections may be thought of as an extension of the MID design. For instance, allowing the user to select between electrical-optical (EO), synthetic-aperture radar (SAR), and infrared (IR) for day, high-altitude, and night missions, respectively, would enhance the multimodal visual capabilities. A key component of the MID is the ability to facilitate the analyst's cognitive ability to fuse multiple image presentations for task completion.

Most modular interface systems, however, are highly specialized, designed as narrow point solutions, and thus are expensive to build and operate, like the examples above. Some software packages are so complex that they require their own analysts and engineers. The typical law enforcement/intelligence fusion/command center cannot afford such luxuries, yet operators are being asked to evolve their skills to handle more time sensitive demands.

Command centers and fusion centers are designed to provide situational awareness and a common operating picture. Command centers such as those of NASA are proliferating around the world. Sensors, surveillance and intelligence solutions rely more and more on video and imagery. Video displays and applications are sharing the real estate with computer screens. As the prices of displays go down, the demand for large displays increases, driving new requirements and benefits. But most displays are not utilized to their full potential. Historically, splitting the screens and running multiple applications on a single view require additional hardware and software components. Consumer-oriented Smart TVs are leveraging Web services and Web applications running through browser-like applications. While this makes the viewing experience more dynamic, it is quite narrow and limited to one-at-a-time views. In mission-critical command centers, rarely is budget spent on enhancing the usability of the content that these architectures provide. Most system integrators and IT professionals are not trained in user experience or interface design and such resources have not been made a priority in the designers of the National Operations Center (NOC) or fusion centers. Yet it is the human computer interface that is paramount to understanding what the data means in context.

More synthesized forms of content include the multimedia presentation of the assets organized into a curated view of digital content, often relied on during mission briefs and commercial presentations. Digital content can be stored locally or on remote servers such as cloud-based data. The data fragments fused can be Web services and conventional application files such as PowerPoint, Web browsers, MP4 video assets and their players, and the like. However, compatibility between operating systems, file standards, proprietary software, and platforms make it difficult to connect, synergize, and fuse the multimodal data into a common view that can be presented on a display screen.

With more and more reliance on computer displays, interface design has become a critical area of focus to increase performance. The primary objective of designers and developers of interactive software systems is to align the mental model of the human with the display of the data. One way UX (user experience) designers improve operator performance is to design an interactive interface enabling the human operator the capability to interact and refine the display.

From the above paragraphs it is evident that there is a need for an interactive multimodal interface that empowers an end user to select his own data sets, live feeds, PowerPoint files, Web services, maps and other content for a fused display presentation without support from software engineers and consultants. The end user should also be able to set up and save connected templates of existing and approved feeds to share them with co-workers, colleagues, and other interested persons, as well as being able to combine different file types, activities, and interactive applications into one single local file that can be distributed as easily as any conventional file for presentation, storage, archiving, and file management purposes.

SUMMARY

A system and method of receiving, connecting, and displaying content from various sources on a single computer interface is disclosed. In one implementation, this computer interface may be a plug-in architecture that allows a user to view and interact with multiple interfaces from different sources simultaneously inside one rich Internet application (RIA) window. In general, an RIA is a Web application that can be run as a desktop browser, a desktop application, or on a mobile device. Users generally need to install a software framework using the computer's operating system before launching the application, which typically downloads, updates, verifies, and executes the RIA.

An interactive multimodal display platform in accordance with the invention (sometimes referred to herein as SHADOWBOX™) may be implemented as an RIA built on a cross-platform runtime system such as Apache Flex (formerly Adobe Flex) or Microsoft Silverlight. Another currently-available runtime system is Adobe Integrated Runtime (also known as Adobe AIR®), which is a cross-platform runtime system developed by Adobe Systems for building desktop applications and mobile applications, programmed using Adobe Flash, ActionScript and optionally Apache Flex. On desktop platforms, Adobe AIR® supports various features such as: (a) opening multiple windows, minimizing, maximizing and resizing AIR Windows; (b) adding a native menu bar to AIR windows, with sub menus and custom menu items; (c) discovering drives, files and folders on the PC, creating and deleting files, renaming, copying and moving files; (d) managing multiple threads, to execute ActionScript 3 code in the background without freezing the user interface: and (e) viewing HTML web pages with full Cascading Style Sheets (CSS) and JavaScript support, with the integrated WebKit-based web browser.

The SHADOWBOX™ application provides several major components, which may be described as follows. The first of these components may be referred to as CompoundDisplay™, which component of SHADOWBOX™ is capable of showing any type of media or data organized in a unique, customizable, multi-view display. In this implementation, the multi-view display takes the form of a rotatable three-dimensional (3D) cube on a single display scene. Each single display scene, herein referred to as an "Act," may include up to 16 Pods, and an unlimited number of Acts can be grouped into one Presentation. Users with administration rights can always save Presentations with a customized title and thumbnail, and anyone can switch between Presentations at any time, just like they would do with any other desktop-application content.

The primary content block is called a "Pod", where each Pod is an interactive, customizable individual program segment that can display any file type, Web site, Web Application Programming Interface (API), document, social network activity or post, or any other application interfaces. Pods are grouped under an Act, individually customizable, active and accessible, and can be connected to other Pods at all times. In general, Pods are conversant with each other's own individual interfaces, placed on the display and sized relative to positions of other Pods, and their order. Pods' auto-sizing and auto-positioning capabilities allow the end user to quickly personalize and display any large set of items/interfaces. All Pods may exchange data between each other in XML/JSON or any other suitable format, share a local database, common settings and rules, and also can be customized to respond dynamically to a change of data or a user interaction in another Pod.

An example of responding dynamically to a change of data in a Pod is found in the CompoundSearch™ component that when a search term is entered into one search field, will provide results in multiple Pods showing individual search results from different sources, data types, services and search engines presented all at the same time in a single interactive Act. Search results may include any local files, user-created content, as well as multiple Web services, such as Google Photos, YouTube videos, maps, shopping information, dictionaries, etc. The category of the search term will trigger CompoundSearch™ searches performed simultaneously across multiple relevant sources (Web, video, music, photos, calendar, dictionary, map, translator, blogs, social networks, etc.) to show only contextual results. The resulting search results may then be displayed in a fully customizable, interactive CompoundDisplay™ view, as described above.

Additionally, the ConnectedView™ component of SHADOWBOX™ enables all Web browser Pods containing a Web-based application to stay connected and fully interactive, all at the same time, in a CompoundView™ display, such that when an event is triggered in one of them, e.g., a link in one of the Pods is clicked, other Web sites in other pods but in the same Act will have access to the same data and optionally, can react to the same event. For example, if multiple Web browser Pods are placed in one Act, each Pod will attempt to bring up relative content in the Web sites they are displaying when a new link is clicked in any one of them.

In succession, if a map Pod is also added to the same Act where now multiple Web sites are already connected, the map Pod will try to "look" for mappable addresses in these Web sites (vCards, titles, tags, etc.) and pin their location on the map. Moreover, if a local media file, for example, a photo, is added to the current scene from a desktop, the map Pod will read photo's metadata, and the location where this photo is taken will be also pinned on the map.

The Act of the SHADOWBOX™ RIA is essentially a workspace capable of combining many segments of user activity into one session that can be re-used the next day or shared with other co-workers. With a simple drag-and-drop feature, end users can create interactive activity spaces in any customized Act with file managers for file systems, network folders, or browsers for Web services, reports, intranet resources, corporate system APIs, documents and anything else workers access daily on their workstations. Furthermore, any SHADOWBOX™ RIA Act may be saved as a Rich Interactive Content (RIC) file that essentially combines any content reachable by RIAs (i.e., Web, cloud, and local resources) into one local file that can be distributed as an e-mail attachment, CD/DVD content, or offered for download or purchase from any Web site. At the same time, this RIC content may also be synced into an end user's SHADOWBOX™ RIA Cloud Account and shared with other SHADOWBOX™ RIA end users.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The examples of the invention described below can be better understood with reference to the following figures. In the figures, like reference numerals designate corresponding parts throughout the different views.

DETAILED DESCRIPTION

In the following description of the preferred and various alternative embodiments, reference is made to the accompanying drawings that form a part hereof, and in which is shown by way of illustration a specific embodiment in which the invention may be practiced. It is to be understood that other embodiments may be utilized and various structural changes may be made without departing from the spirit and scope of this invention.

Figure 1:
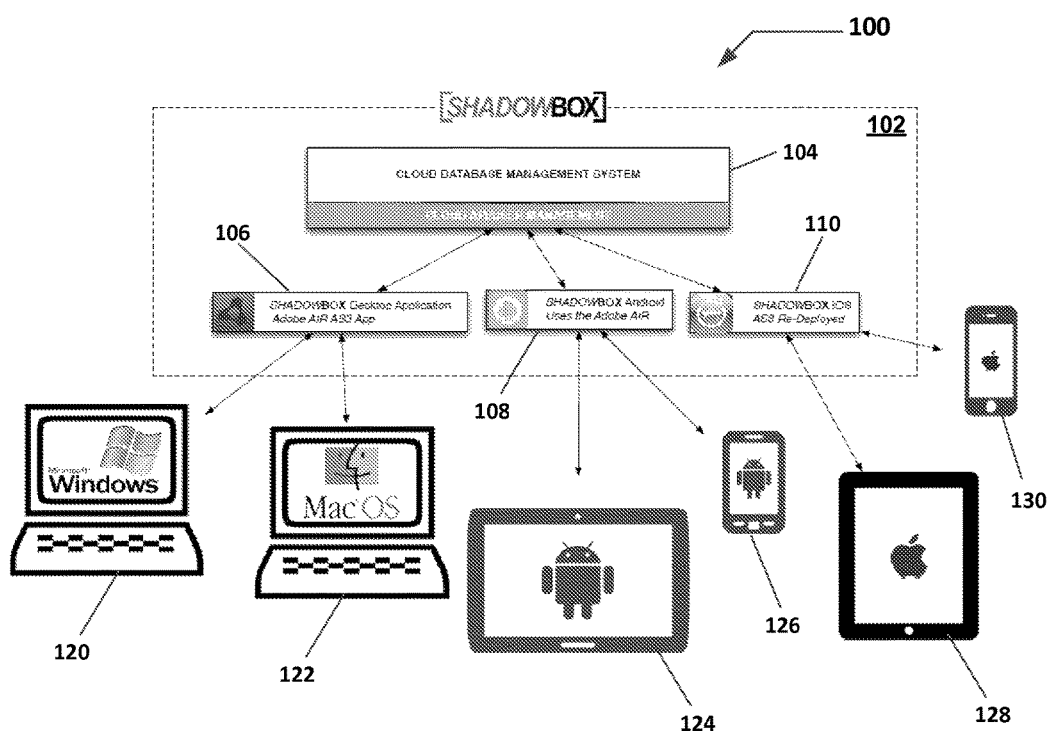
FIG. 1 shows a high-level block diagram 100 illustrating an example implementation of an interactive multimodal display platform and its software components in accordance with the invention.

FIG. 1 shows a high-level schematic diagram 100 illustrating an example implementation of an interactive multimodal display platform 102 in accordance with the invention. The interactive multimodal display platform 102 comprises a cloud database management system 104 built on Java Web application systems 106, 108, and 110, which may be Adobe AIR® application source code 106 maintained separately for Adobe AIR® compiler for Windows and Mac OS X desktops, such as desktop 120 and desktop 122, respectively; Adobe AIR® application source code 108 maintained separately for Adobe AIR® compiler for Android applications, such as Android Tablet 124 and Android mobile phone 126; and Adobe AIR® application source code 110 maintained separately for the Adobe AIR® compiler for iOS applications, such as iPad® 128 and iPhone® 4/5 130.

Figure 2:
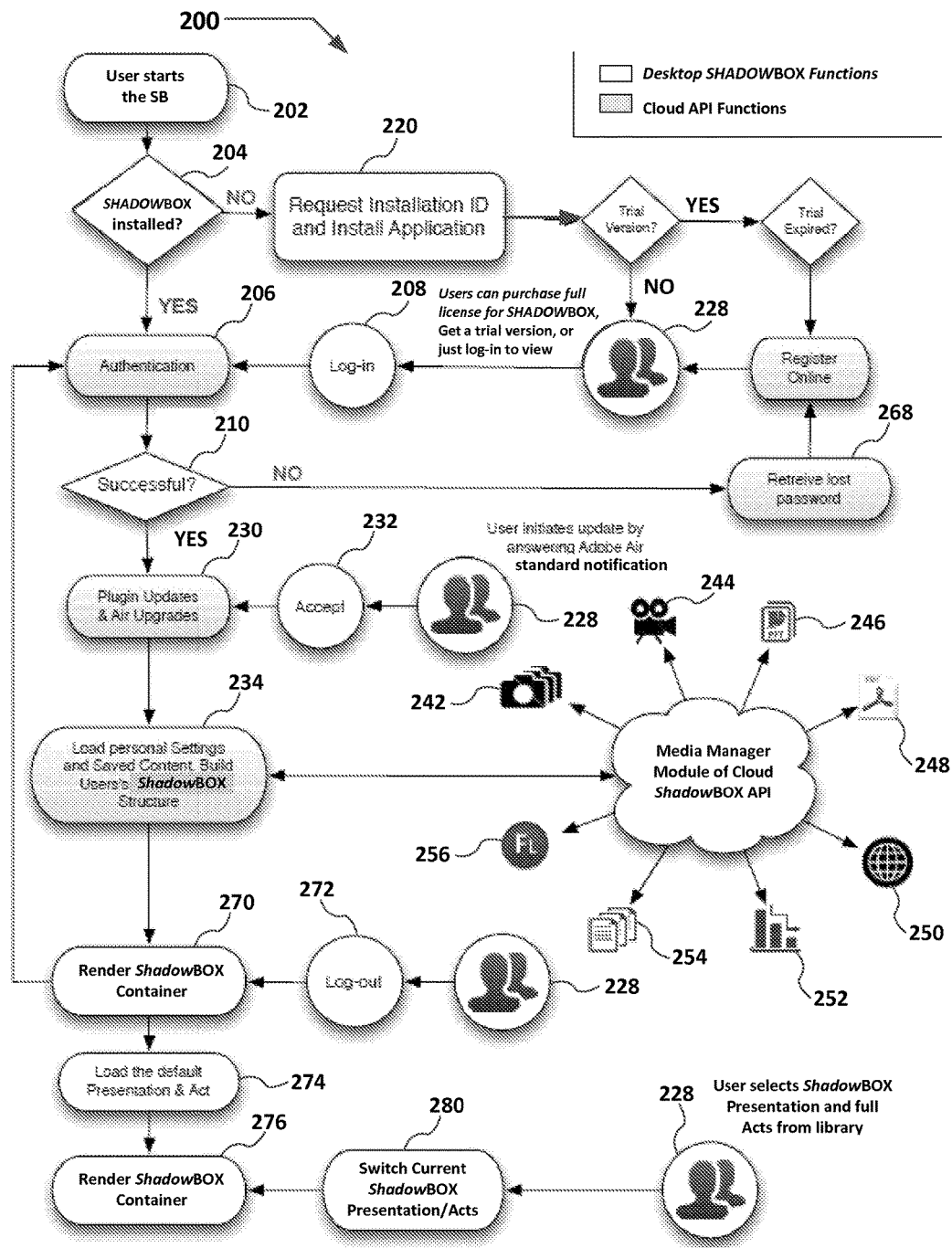
FIG. 2 is a flow chart illustrating a process flow of installing, authenticating, activating and operating the interactive multimodal display platform of Exhibit 1.

Turning to FIG. 2, a flow chart illustrating a process of activating and operating the interactive multimodal display platform of Exhibit 1 is shown. In step 202, an end user starts the SHADOWBOX™ RIA. In decision step 204, the process determines if the SHADOWBOX™ RIA is installed on the end user's device, which may be a desktop or mobile device. If it is determined that SHADOWBOX™ is installed, the process proceeds to step 206 where the end user 228 may log in 208. Decision step 210 determines if the log-in is successful; if the log-in is successful, the process proceeds to step 230, where the end user 228 can begin utilizing the SHADOWBOX™ RIA.

In step 230, the end user 228 is given the opportunity to accept updates to the SHADOWBOX™ RIA, and upgrades to Adobe AIR® systems (if available) 106, 108, and 110 of FIG. 1. If the end user 228 elects to do so, in step 232, any selected updates and upgrades are made and the process proceeds to step 234.

In step 234, the end user 228 may load his Personal Settings and Saved Content (explained in more detail below) into the system. In step 234, the end user 228 may also generate new multimodal content via a connection to the Internet 240, which allows the end user 228, using the SHADOWBOX™ RIA, to build and save customized multi-view displays with data and content from both Web-based sources and locally-stored, user-created files, such as photos 242, videos 244, Microsoft PowerPoint (PPT) files 246, Adobe Acrobat PDFs 248, Web-based content 250, charts and maps 252, locally-stored Microsoft Word documents 254, and Adobe Flash content 256.

The files from each of these sources of data and content, both locally-stored and Web-based, are then connected and displayed in a multi-view display inside one RIA window that displays what may be may be referred as an "Act," which is created by the end user 228 using the Compound-Display™ component of the SHADOWBOX™ RIA. In general, each Act may contain up to 16 Pods, with each Pod displaying content from a source selected by the end user 228. With the CompoundDisplay™ component, the end user 228 may create an Act by building each Pod that will be included in the Act. In general, this may be done by selecting the Pod type, assigning a title to the Pod and a number that determines the Pod's position in the Act, and then selecting the file that will be displayed in the Pod. Other options are available to the end user 228, depending on the type of file. For example, in the case of a Video Player or a Single Media Pod, Autoplay and Loop options may exist, which provides for animation automatically starting when the Act containing the Pod is opened and continuous playing of the animation in a loop, respectively.

In step 234, the step of building an Act may also include deleting Pods from a pre-existing Act, editing Pods already included in a pre-existing Act, and re-sequencing Pods in a pre-existing Act. Once the end user 228 has selected the Presentation he or she desires, the process then proceeds to step 270 where the default Act of that Presentation is rendered for the end user's view.

Every installation of the SHADOWBOX™ RIA will have a default Presentation, a default content that will be available to all users whether or not they are logged in. SHADOWBOX™ will always switch to that content by default when end user 228 logs out as shown in step 274 and in step 276.

Every installation of SHADOWBOX™ will give any user the ability to view cached RIC files, a local file that contains a SHADOWBOX™ Presentation, without logging in. The content may be loaded in the manner described above, or as shown in step 280 by a user 228.

Figure 3:
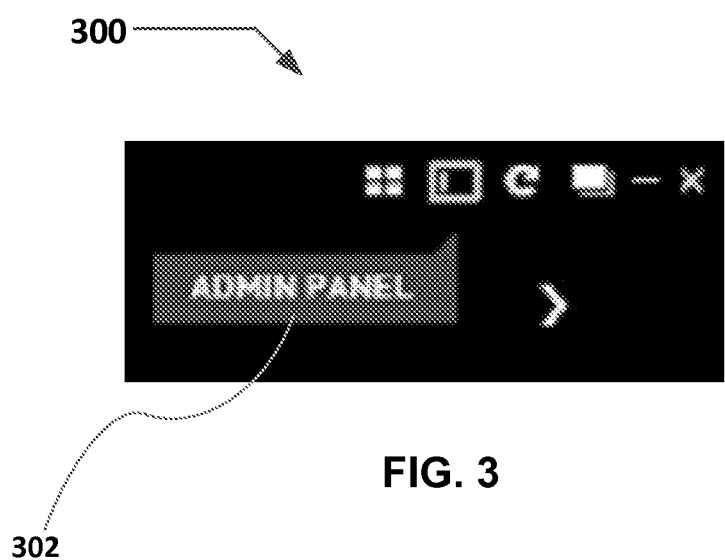
FIG. 3 shows a controller for switching to Admin Mode from Presentation mode, in accordance with the present invention.

FIG. 3 shows a controller for switching to Admin Mode from Presentation mode, which the end user may use to create, edit, or delete any Act, Pod, or content therein once the end user is authenticated and logged into the SHADOWBOX™ application. By clicking on the Admin Panel icon, the end user is able to access an interface that allows editing Presentation Content of an Act.

Figure 4:
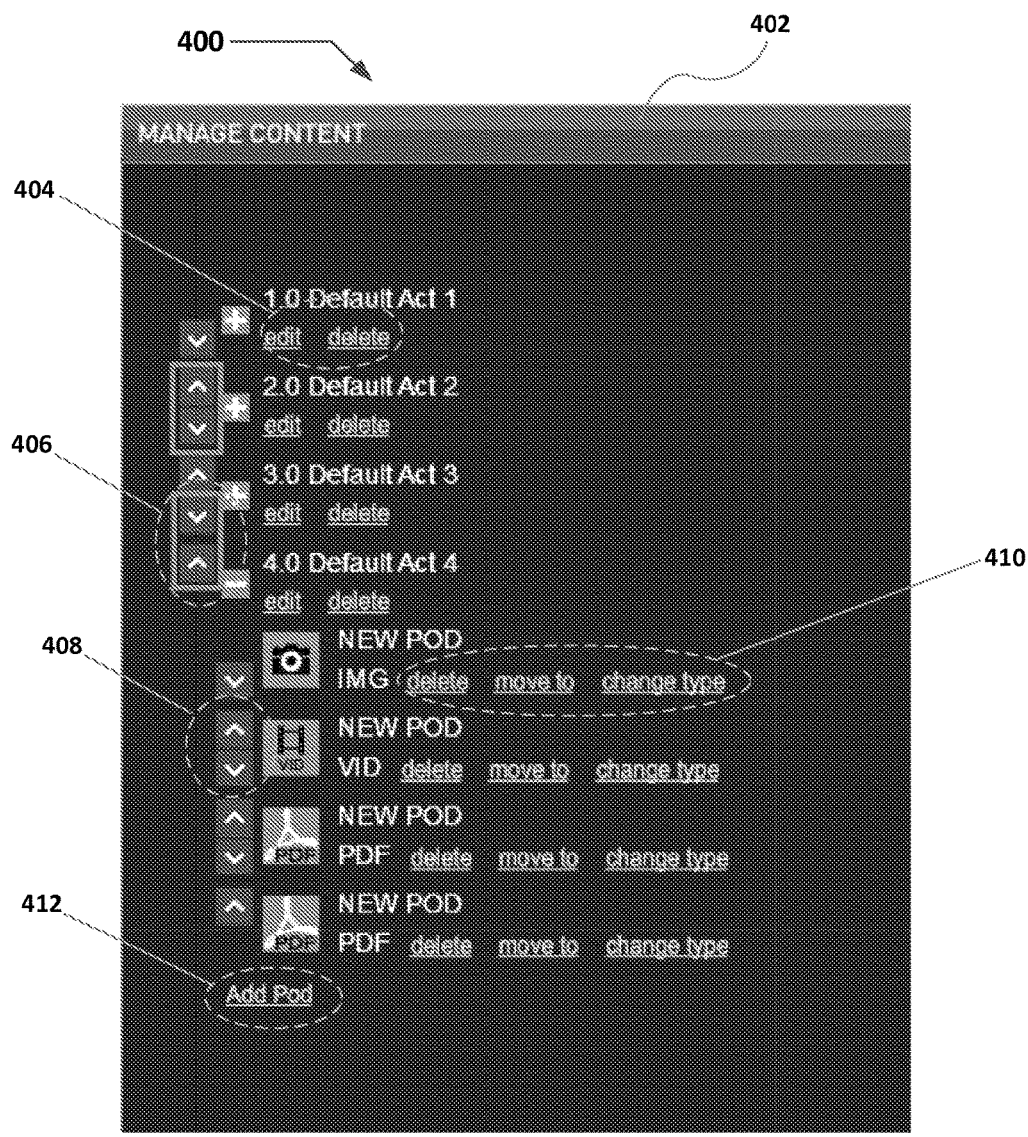
FIG. 4 shows a simplified interface for editing Presentation Content in Admin Mode, in accordance with the present invention.

FIG. 4 shows a simplified interface 400 for editing Presentation Content of a SHADOWBOX™ Presentation. Interface 402 is a display in the Admin Mode that presents and gives the end user access to the Acts presently included in a Presentation of the SHADOWBOX™ RIA. As an example, interface 402 displays 4 Default Acts, numbered 1, 2, 3, and 4. Arrows 406 located under an Act allow the end user to move an Act up or down within a Presentation; likewise, Arrows 408 allow the end user to move a Pod up or down within an Act.

As to the Pods within an Act, links 410 allow the end user to delete a Pod, move the Pod to another Act, or to change the type of the Pod. The Add Pod link 412 allows the end user to add a Pod within the active Act. A new Act may be added by clicking on an Add Act link (not shown) that appears on the Admin Panel, which may be, for example, at the bottom left or bottom right of the Admin Panel.

Figure 5:
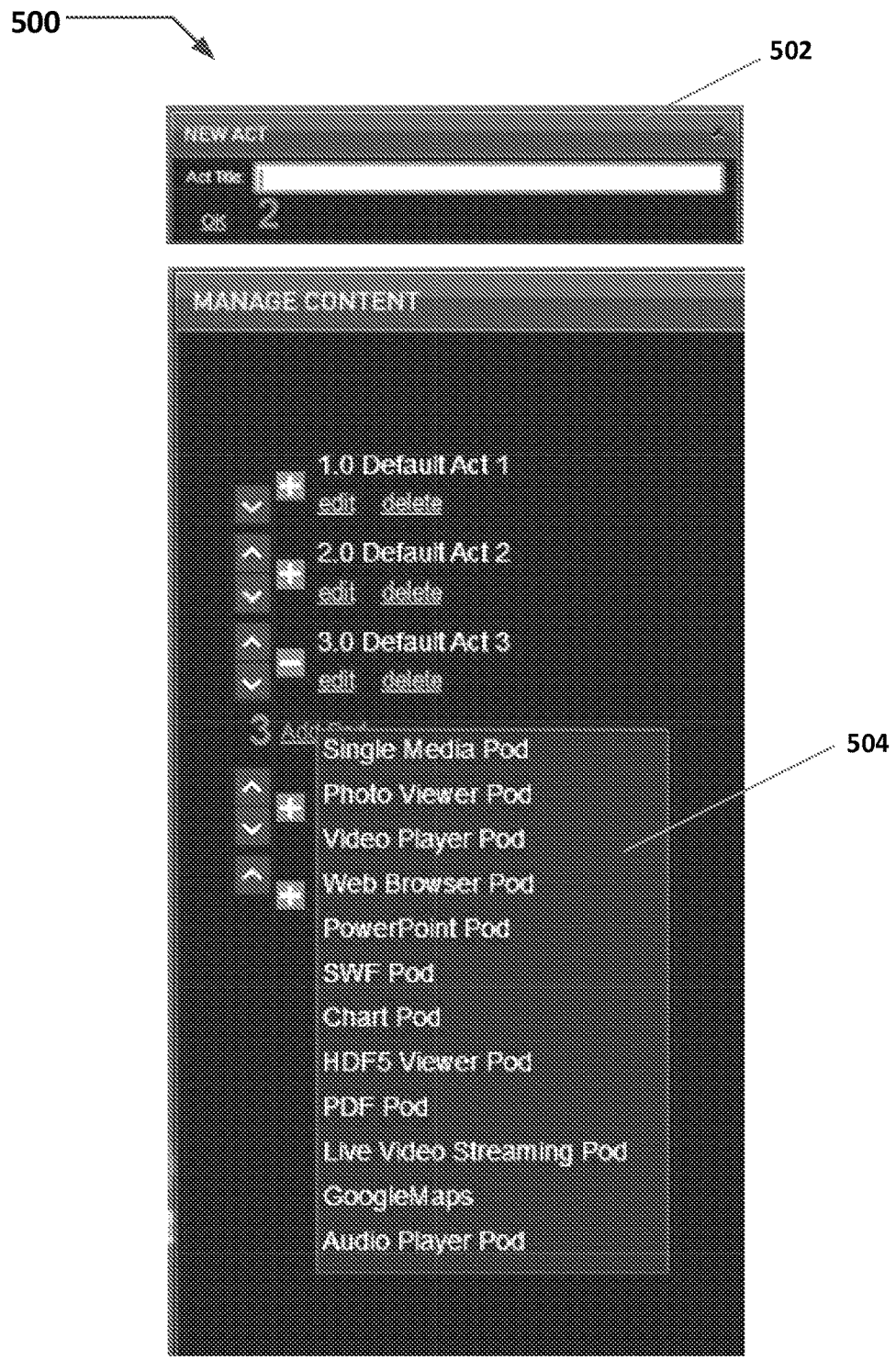
FIG. 5 shows a user interface for adding new Acts and Pods into a Presentation in simplified Admin Mode in accordance with the present invention.

Turning to FIG. 5, a user interface 500 for adding new Acts and Pods into a Presentation in simplified Admin Mode is shown, which interface 500 is displayed when the end user clicks on an Add Act link on the Admin Panel. The interface 500 may include a New Act dropdown menu 502 that allows the end user to assign a title to the new Act. Pod List 504 is a window that appears on the display that lists the Pod types that are available on the particular SHADOWBOX™ RIA; in this implementation, there are twelve Pod types available.

In general, when the end user selects a Pod type from dropdown menu 502, he or she is then given a text box wherein the title of new Pod may be added, and also one or more links or dropdown menus dependent on the type of Pod being added. For example, in the Photo Viewer Pod, there may be an Add Category link that allows the end user to name a category into multiple photos can be added. Some Pod types will also include an Add photos, Add videos, etc., type of link whereby the desired files are added to the Pod. The Admin Mode also provides the end user with capability to add notes regarding the files being included in a Pod, such as presenter information for a PowerPoint file or information related to photos being added to a Photo Viewer Pod. Thumbnails can also be created and previewed for certain file types, such as the Video Player Pod and the Single Media Pod.

Figure 6:
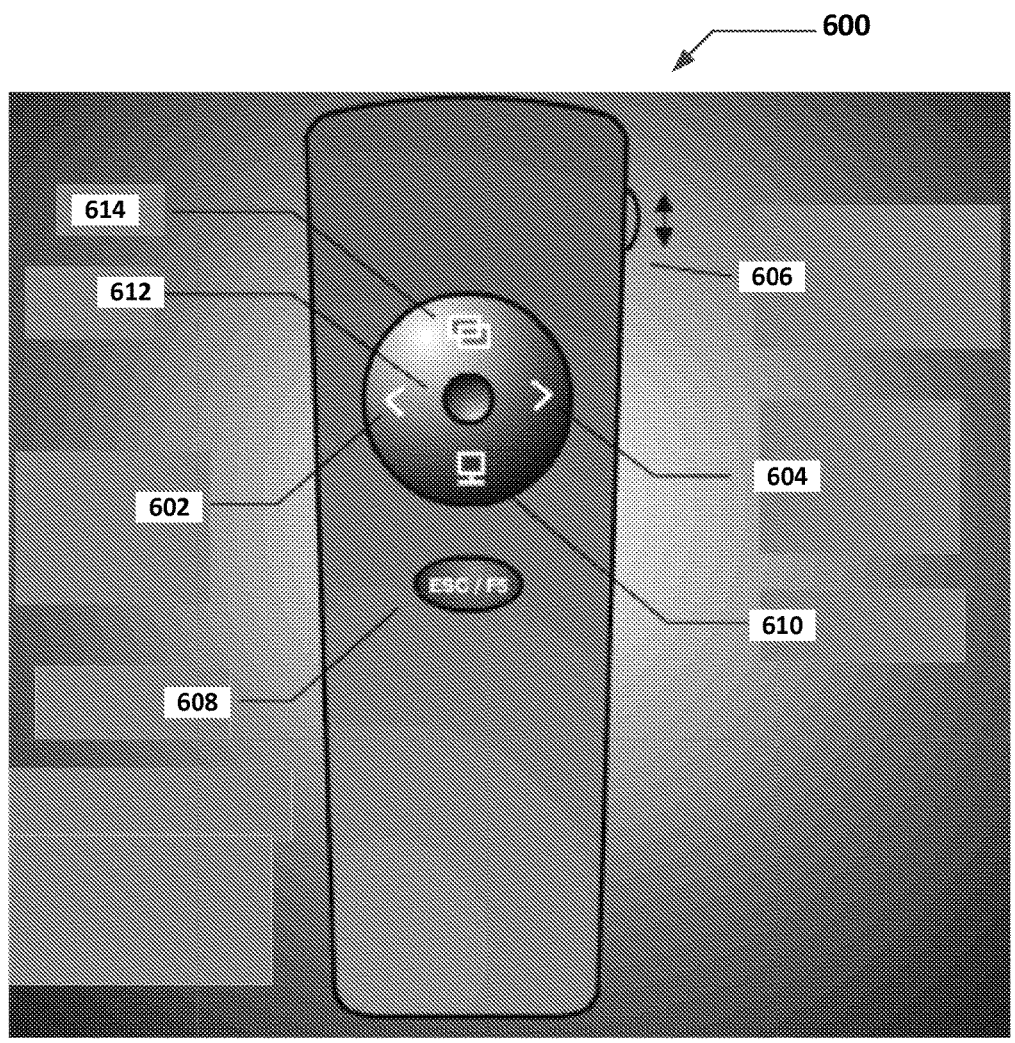
FIG. 6 shows a simplified controller for manipulating Acts and Pods in a Presentation Mode remotely in accordance with the present invention.

The SHADOWBOX™ RIA also provides an end user with the capability of manipulating Acts and Pods while in the Presentation Mode. RIA FIG. 6 shows a simplified controller for remotely manipulating Acts and Pods in a Presentation Mode of the SHADOWBOX™ RIA. Arrows 602 and 604 allows the end user to switch between Acts, with arrow 602 switching to a higher-numbered Act and arrow 604 switching to a lower-numbered Act. Once in an Act, the first Pod of the Act may be active by default, and button 606 may be used to roll forward/backward to the next Pod.

While in a Video Viewer Pod, the Full Screen button 608 may be used to maximize the video display and the ESC/F5 button 610 may be used to play or pause the video. In general, when active in a presentation-type Pod, the end user may first maximize the Pod using the Full Screen button 608, and then move between photos, slides, etc., using arrows 602 and 604. Pointer button 612 may be used to point to or highlight any particular section of the content being displayed in the Pod. The ALT TAB 614 may be used to move between other applications running on the end user's device and the SHADOWBOX™ RIA.

Thus the Admin and Presentation Modes of SHADOWBOX™ RIA allow an end user to manage all media types with a single application in a single interface; present static and dynamic content with a single, interactive Compound-Display™ View; combine local and remote sources (local computer files and Web content) using a better presentation tool than PowerPoint or Keynote; and create real-time connections between divergent types of applications and data sources.

The foregoing description of one or more implementations has been presented for purposes of illustration and description. It is not exhaustive and does not limit the claimed inventions to the precise form disclosed. Modifications and variations are possible in light of the above description or may be acquired from practicing the invention.

What is claimed is:

1. A method of displaying multimodal content in a multi-view presentation, the method comprising:
   accessing a plurality of Web-based and/or locally-based applications and/or data files;
   establishing connections between the plurality of Web-based and/or locally-based applications and/or data files;
   accessing a plurality of display files associated with the plurality of accessed applications and/or data files;
   generating a Pod for each accessed display file using a template designed for each Pod type, wherein the Pod type is at least partly based on applications and/or data files accessed in the Pod, and the Pod is capable of executing one or more processes associated with the accessed applications and/or data files;
   generating an Act, wherein the Act comprises at least one Pod;
   connecting Pods within the Act such that processes in Pods within the Act are simultaneously active and related based at least partly on content of the Pods;
   receiving a user request for a search;
   performing the search across the Pods in the Act and the plurality of Web-based and/or locally-based applications and/or data files;
   generating one or more Pods within the Act for each single result of the search;
   generating a Presentation, wherein the Presentation comprises one or more Acts; and
   displaying the Presentation in the form of a three-dimensional (3D) cube, wherein one or more faces of the cube each comprise an Act displayed in a flat two-dimensional (2D) view; and
   receiving user activity in an application accessed and displayed in a Pod and modifying application processes associated with one or more Pods based at least partly on the received user activity.

2. The method of displaying multimodal content of claim 1, wherein generating an Act comprises receiving a user input, wherein the user input includes one or more of:
   dragging and dropping files from a desktop computer into the Act;
   dragging and dropping regular text with an address or a Web URL into the Act; and
   dragging and dropping a text file into the Act.

3. The method of displaying multimodal content of claim 1, further comprising:
   receiving a user input to edit an Act in an admin mode, wherein the user input comprises one or more of:
   deleting a Pod from the Act;
   moving a Pod within the Act;
   moving a Pod from the Act to another Act;
   changing a Pod from one Pod type to another Pod type;
   changing display content of a Pod; and
   editing and displaying the Act based on the user input.

4. The method of displaying multimodal content of claim 1, further comprising the step of communicating between Pods of discrepant types of an Act by exchanging data between the Pods in Extensible Markup Language (XML) or JavaScript Object Notation (JSON) format.

5. The method of displaying multimodal content of claim 1, wherein the Pod type comprises a Single Media Pod, a Photo Viewer Pod, a Video Player Pod, a Web Browser Pod, a PowerPoint Pod, a Flash Animation (SWF) Pod, a Chart & Graph Pod, an HDF5 Data Viewer Pod, a PDF Viewer Pod, a Live Video Streaming Pod, a GoogleMaps Pod, and an Audio Player Pod.

6. An interactive multimodal display platform for providing customizable multi-view presentations, the interactive multimodal display platform comprising:
 a Rich Internet Application (RIA) configured to connect with Web-based applications and locally-based data;
 a computer system configured to support the RIA by interfacing between the RIA and the Web-based applications and/or locally-based data;
 a compound display module configured by the RIA to display content from the Web-based applications and/or locally-based data in a single, interactive customizable multi-view display, wherein the multi-view display comprises one or more Acts, wherein an Act comprises one or more Pods and the RIA is configured to execute and/or display a program segment in each Pod, the program segment associated with, or at least partly based on, the accessed Web-based applications and/or locally-based data, and the RIA is further configured to:
  receive a user request for a search, perform the search across Pods in an Act and the accessed Web-based applications and/or locally-based data,
  generate one or more Pods within the Act for each single result of the search;
  generate a Presentation, wherein the Presentation comprises one or more Acts;
  display the Presentation in the form of a three-dimensional (3D) cube, wherein one or more faces of the cube each comprise an Act displayed in a flat two-dimensional (2D) view; and
 a connected view module configured to enable a dynamic connection between the Pods within an Act, wherein a user-triggered event in a first Pod in a first Act triggers the RIA to perform one or more contextually related actions and/or display results in second, third or more Pods within the first Act.

7. The interactive multimodal display platform of claim 6, wherein the RIA is further configured to:
 receive a user input to edit an Act in an admin mode, wherein the user input comprises one or more of:
 delete a Pod from the Act;
 move a Pod within the Act;
 move a Pod from the Act to another Act;
 change a Pod from one Pod type to another Pod type;
 change the content of the Pod; and
 editing and displaying the Act based on the user input.

8. The interactive multimodal display platform of claim 6, wherein the one or more contextually related actions comprise: one or more of searching for contents and/or programs related to the triggering event locally and/or on the Web and executing web-based and/or local programs contextually related to the triggering event.

9. The interactive multimodal display platform of claim 6, wherein the contextually related actions comprise:
 auto-generating content in the second, third and/or more Pods of the first Act based on content displayed in the first Pod of the first Act and/or based on receiving user input in the first Pod of the first Act.

10. The interactive multimodal display platform of claim 9, wherein the user input comprises receiving an input from a user dragging and dropping content from the first Pod to the second Pod.

11. A method of displaying results of a single-topic search in a multi-view presentation, the method comprising:
 establishing connections between and accessing a plurality of Web-based and/or locally-based data files;
 generating one or more Acts, wherein Acts comprise one or more Pods, wherein each Pod is configured to execute a program segment and display content based on an accessed data file;
 dynamically connecting Pods within an Act, wherein an event in one Pod triggers contextually related events in other Pods;
 in a first Pod of a first Act, receiving a user request for a single-topic search;
 simultaneously searching for the single-topic in Pods within the first Act and the plurality of Web-based and/or locally-based data files;
 determining one or more categories of the single-topic search;
 generating additional search terms contextually related to the single-topic search, based at least partly on the one or more categories of the single-topic search;
 determining additional web-based and/or locally-based sources to search for the single-topic and additional search terms;
 searching for the single-topic and/or additional search terms in one or more of: contents of Pods within the first Act, web-based and/or locally-based data files and the determined additional Web-based and/or locally-based sources;
 generating one or more Pods within the first Act for each single result of the search; and
 displaying the first Act in a multi-view presentation, wherein the multi-view presentation is in the form of a three-dimensional (3D) cube, wherein one or more faces of the cube each comprise an Act displayed in a flat two-dimensional (2D) view.

12. The method of displaying results of a single-topic search of claim 11, wherein displaying the first Act in a multi-view presentation further comprises displaying each of the search results in a Pod within the first Act, wherein each Pod comprises its own window within the multi-view presentation.

13. The method of displaying results of single-topic search of claim 11, further comprising:
 modifying the search results by receiving an input from a user, the user input comprising dragging and dropping more content from a desktop computer or a Web URL;
 customizing, saving, and sharing the search results;
 retrieving relative content from the new content added into the search results; and
 displaying the results of the new search in the multi-view presentation.

14. The method of displaying results of single-topic search of claim 11, further comprising:
 reading metadata from media files in media Pods;
 putting a pushpin on a map within a map Pod representing a location; and
 connecting locations with location-based data of any Web source if added into an Act with a map showing a location.

* * * * *